Dec. 3, 1935. O. G. BRAUCH 2,023,120
CAKE PAN
Filed April 4, 1935
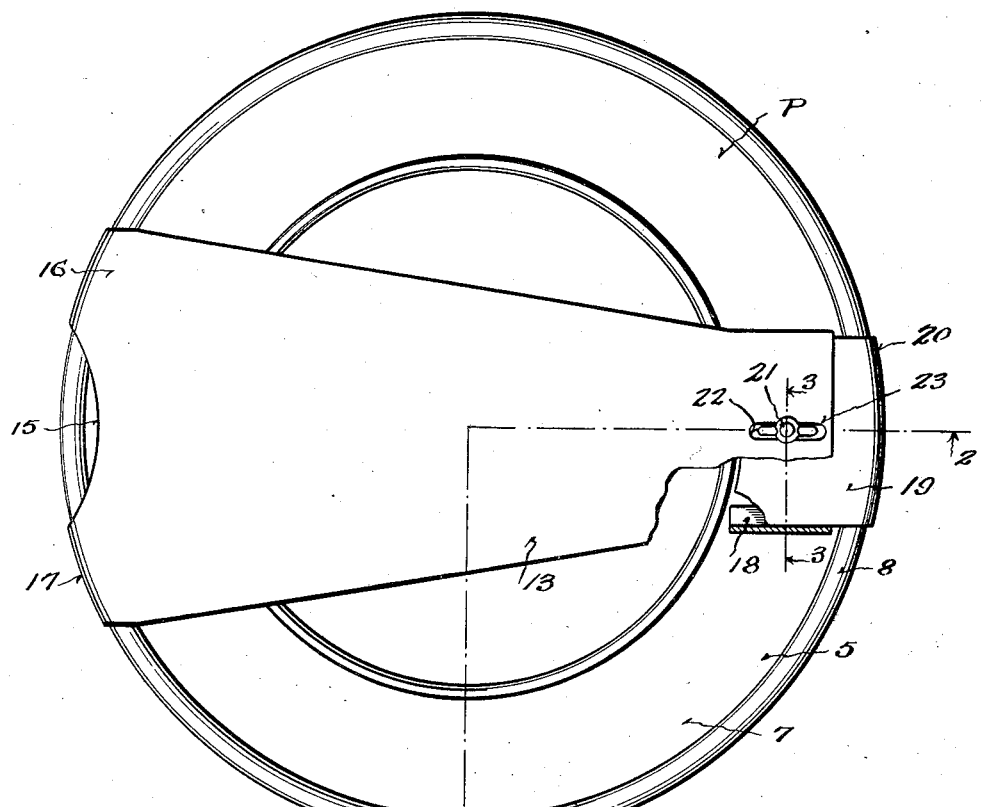
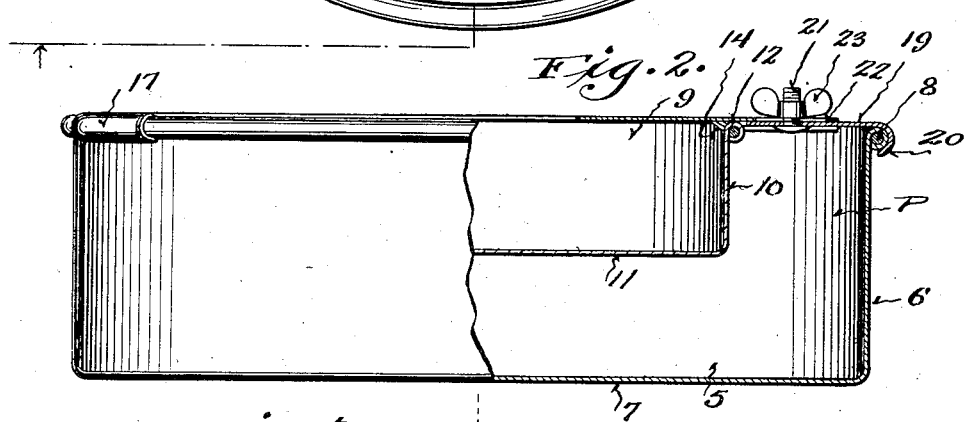
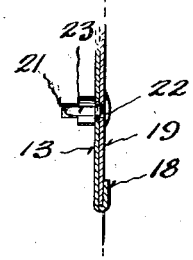
Inventor
O. G. Brauch Patented Dec. 3, 1935

2,023,120

UNITED STATES PATENT OFFICE 2,023,120

CAKE PAN

Otto G. Brauch, Milwaukee, Wis.

Application April 4, 1935, Serial No. 14,656

3 Claims. (Cl. 53—6)

This invention appertains to cooking utensils, and more particularly to an improved pan, especially adapted for baking cakes of the torte type.

In torte cakes, the cake is formed with a central top cavity, in which the desired type of filling is placed. Considerable difficulty is encountered in forming the cake with this cavity during the baking thereof. It is therefore a prime object of my invention to provide a cake pan in which the central top cavity is formed while the cake is being baked, so as to simplify the baking process, and to eliminate the loss of dough, and whereby the cake can be immediately filled after the baking thereof.

Another important object of my invention is the provision of a cake pan having a suspended core or form for fitting inside of the pan and the dough, so that a cake will be formed with a central cavity with one baking.

Another salient object of my invention is the provision of novel means for supporting the core, whereby the same can be quickly and easily associated with or removed from the cake pan, so that the dough can be easily placed in the pan and the baked cake quickly removed therefrom.

A further object of my invention is to provide a torte cake pan of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a top plan view of my improved torte cake pan, with parts thereof broken away and in section.

Figure 2 is a fragmentary sectional view through the improved cake pan, taken substantially on the line 2—2 of Figure 1, looking in the direction of the arrow.

Figure 3 is a detail sectional view taken substantially on the line 3—3 of Figure 1, illustrating a detail of the core-holding means.

Referring to the drawing in detail, wherein similar reference characters designate corresponding parts throughout the several views, the letter P generally indicates my improved cake pan, which includes an outer pan structure 5, into which the dough is adapted to be placed. This outer pan structure 5 may include a cylindrical side wall 6, and a bottom wall 7. The upper edge of the side wall 6 can be rolled to provide a bead 8, so as to strengthen the pan, and to eliminate the formation of raw edges.

Within the main or outer pan 5 I arrange the inner core pan 9. This core pan 9 is of a considerably smaller size than the outer pan, and thus the same is of less diameter than the outer pan, and of less depth than the outer pan. As shown, the inner pan 9 includes the cylindrical side wall 10, which may be formed integrally with the bottom wall 11. The upper edge of the side wall 10 can also be rolled to provide the reinforcing rib 12.

One of the important features of my invention is the provision of novel means for supporting the inner or core pan 9 with the outer bake pan 5, whereby the inner pan will be centrally located relative to the outer pan, and with the bottom wall 11 disposed in spaced relation to the bottom wall 7 of the outer pan. The means for suspending and locating the core pan 9 relative to the outer or main pan 5 includes a plate 13, which extends substantially diametrically across the inner pan 9. This plate 13 is soldered, or otherwise secured, as at 14, to the opposite top edges of the side wall 10. One end of the plate 13 is preferably bifurcated or notched, as at 15, to provide legs 16, the edges of which are bent to provide arcuate hooks 17 for engaging over the bead 8 of the pan 5 at spaced points on one side thereof. The outer end of the plate 13 terminates short of the side wall 6 of the pan 5, and its end of the plate has its side edges folded to provide guides 18 for slidably receiving the adjustable slide plate 19. The outer end of the slide plate 19 is formed with a hook 20 for engaging over the bead 8 of the side wall between the hooks 17 and on the opposite side of the main pan from the hooks 17.

This slide plate 19 carries a threaded bolt 21, which is adapted to extend through a longitudinally extending slot 22 formed in the supporting plate 13. A thumb nut 23 is threaded on the bolt 21, and is adapted to impinge against the upper face of the main plate 13 for holding the slide plate 19 in a preferred adjusted position.

In use of my improved cake pan, the inner pan or core 9 is removed from the outer pan 5, and the desired amount of dough is placed in the outer pan. The inner or core pan 9 is now placed directly in the dough, and within the outer pan 5, with the hooks 17 over the rim or bead 8. The thumb nut 23 is loosened so that the slide plate can hook over the bead 8, after which the slide plate 19 is moved inwardly, and the thumb nut is again tightened. By this simple process the core pan is centrally located relative to the main pan, and is held in its desired suspended position.

After the cake is baked, it is merely necessary to loosen the thumb nut 25, and to slide the adjustable plate 19 outwardly, with the hook 20 out of engagement with the bead, after which the core pan can be lifted out. The cake can now be removed from the pan 5, and if preferred the pan 5 can be of the sectional type to facilitate such removal. However, this forms no part of my present invention, as there are sectional cake pans on the market at the present time.

If desired, material can be placed within the core pan 9 so that such material can be cooked during the baking of the cake.

While I have illustrated one approved means for holding the inner form pan 9 within the outer bake-pan 5, it is to be understood that various other means can be employed for holding the inner form pan 9 in position without departing from the spirit or the scope of my invention.

Obviously, the form pan 9 can be made in various sizes or of an approved size for making the desired type of torte. Thus, the inner form pan 9 can be made much deeper and of a greater diameter than shown in the drawing, so as to bring about the baking of a cake having a relatively thin bottom wall and side wall.

While I have referred to the baking of a torte throughout this specification, it is to be understood that my improved device can be used for baking other kinds of cakes or eatables.

After a cake has been baked in my pan the same can be filled with any preferred type of filling, and the baked cake forms an ideal means for receiving a frozen eatable, such as ice cream, custard, ices, etc.

Changes in details may be made without departing from the spirit or the scope of my invention, but what I claim as new is:

1. A torte cake pan comprising an outer main pan, an inner core pan, a suspension plate rigidly secured to the core pan, means on one end of the suspension plate for engaging one side of the main pan, and adjustable means carried by the other end of the plate for engaging the other side of the main pan.

2. A torte cake pan comprising a main outer pan including a cylindrical side wall and a bottom wall, a rolled bead on the upper edge of the side wall, an inner core pan of less diameter and depth than the outer pan including a cylindrical side wall and a bottom wall, and means for suspending the inner core pan centrally within the outer pan including a plate rigidly connected to the core pan, hooks on the corners of the plate at one end for engaging over the bead of the main pan, a slide plate carried by the other end of the plate, a hook formed on the outer end of the slide plate for engaging over the bead of the outer pan, and means for holding the slide plate in an adjusted position on the first plate.

3. A torte cake-pan comprising an outer main pan, an inner core pan, means on one side of the core pan for detachably engaging one side of the main pan, and adjustable means carried by the other side of the core pan for detachably engaging the other side of the main pan.

OTTO G. BRAUCH.